United States Patent [19]

Esterowitz et al.

[11] Patent Number: 5,313,477
[45] Date of Patent: May 17, 1994

[54] RARE EARTH ION DOPED CW CASCADE FIBER LASER

[75] Inventors: Leon Esterowitz, Springfield; Roger E. Allen, Alexandria, both of Va.

[73] Assignee: The United States of America as represented by the Secretary of the Navy, Washington, D.C.

[21] Appl. No.: 968,890

[22] Filed: Oct. 30, 1992

[51] Int. Cl.[5] .......................... H01S 3/07; H01S 3/094
[52] U.S. Cl. ......................................... 372/6; 372/70; 372/71; 372/91
[58] Field of Search .................. 372/6, 40, 33, 70, 75, 372/71, 91, 99

[56] References Cited

U.S. PATENT DOCUMENTS

| | | | |
|---|---|---|---|
| 5,084,880 | 1/1992 | Esterowitz | 372/6 |
| 5,084,890 | 1/1992 | Brierley | 372/6 |
| 5,226,049 | 7/1993 | Grubb | 372/91 |

FOREIGN PATENT DOCUMENTS 3289186  12/1991  Japan ........................................ 372/6

OTHER PUBLICATIONS

Quimby et al., "Continuous-wave lasing on a self-terminating transition", Applied Optics 28 (1) 14-16 (Jan. 1, 1989).

Carter et al., "Thulium-Doped Fluorozirconate Fiber Lasers Operating at Around 0.8, 1.47, 1.9 and 2.3 $\mu$m Pumped at 0.79 $\mu$m", OSA Proceedings on Advanced Solid State Lasers, 1991, 10 218-221 (1991) no month available.

Primary Examiner—Rodney B. Bovernick
Assistant Examiner—Robert McNutt
Attorney, Agent, or Firm—Thomas E. McDonnell; George Jameson

[57] ABSTRACT

A continuous wave(CW) activator ion doped fiber laser is presented which lases at a normally self-terminating laser transition at a slope efficiency greater than that achieved by a self-terminating fiber laser. Two laser transitions, one corresponding to a self-terminating laser transition and the other to a transition out of the lower level of the self-terminating transition, are simultaneously stimulated in the activator ion doped fiber. Through simultaneous lasing of the two wavelengths corresponding to these transitions, the lower level of the self-terminating transition is sufficiently depopulated so that CW operation is achieved.

23 Claims, 2 Drawing Sheets

RARE EARTH ION DOPED CW CASCADE FIBER LASER

BACKGROUND

1. Field of the Invention

The present invention relates to lasers and particularly to a diode-pumped, fiber laser doped with preselected rare earth activator ions for producing simultaneous output continuous wave (CW) laser emissions at wavelengths determined by the rare earth activator ions.

2. Description of the Prior Art

The term "self-termination" refers to the phenomenon wherein a continuous wave (CW) output, at an appreciable slope efficiency, from a laser source is deemed unlikely when the electron lifetime in the lower energy level ($\tau_{lower}$) is longer than that of upper energy level ($\tau_{upper}$). A continuous wave (CW) output at an appreciable slope efficiency is deemed feasible when the electron lifetime in the lower energy level ($\tau_{lower}$) is shorter than that of the upper energy level ($\tau_{upper}$). In other words, if $\tau_{upper} > \tau_{lower}$ then CW output is feasible at an appreciable slope efficiency, for example, greater than 10% and if $\tau_{upper} < \tau_{lower}$ then CW output is not feasible at an at an appreciable slope efficiency, for example, greater than 10%.

The self-termination phenomenon can be more readily understood if one considers that if $\tau_{upper} < \tau_{lower}$, then, at some future time, as electrons transfer out faster from the upper energy level into the lower energy level than electrons transfer out of the lower energy level, the lower energy level will eventually become filled to a greater extent than the upper energy level. When the lower energy level becomes filled to a greater extent than the upper energy level, corresponding to the CW lasing transition, then it is considered that the given transition from the upper energy level to the lower energy level has self-terminated. Thus, self-termination makes a CW laser output above an appreciable slope efficiency almost impossible to occur.

Such a self-termination phenomenon with respect to the four level system of $Er^{3+}$ is discussed by Quimby et al. in their paper titled *Continuous-Wave Lasing on a Self-Terminating Transition* published in Applied Optics, Volume 28, No. 1 in January, 1989 at pp. 14. However, Quimby et al. state in their conclusion that ". . . cw [continuous wave] lasing is possible in certain cases when the . . . lifetime of the upper level is shorter than that of the lower laser level . . . " Quimby et al. reach their conclusion by showing that the condition for CW lasing is as follows:

$$\tau_{upper} > \beta_{upper \to lower} \tau_{lower}$$

where $\tau_{upper}$ is the upper laser energy level electron lifetime, $\beta_{upper \to lower}$ is the branching ratio from the upper laser energy level to the lower laser energy level and $\tau_{lower}$ is the lower laser energy level electron lifetime. Thus, according to Quimby et al., even if $\tau_{lower}$ is greater than $\tau_{upper}$, it is possible to obtain CW lasing for a transition if the condition, $\tau_{upper} > \beta_{upper \to lower} \tau_{lower}$, can be satisfied.

Carter et al. in their paper titled *Thulium-Doped Fluorozirconate Fiber Lasers Operating at Around 0.8, 1.47, 1.9, and 2.3 μm Pumped at 0.79 μm* published in OSA Proceedings on Advanced Solid-State Lasers, Volume 10 in 1991 at pp. 218–221 explore the $^3H_4 \to {}^3F_4$ laser transition corresponding to 1.47 μm in a thulium doped fluorozirconate laser fiber. Carter et al. state on page 220 that > Initial experiments have . . . been carried out on laser oscillation at 1.47 μm on the $^3F_4$-$^3H_4$ transition using a cavity consisting of mirrors of >99% reflectivity butted at either end of the fiber. Self-terminating pulsed laser emission is observed at 1.47 μm for a threshold power of 250 mW incident on the launch microscope objective (175 mW being launched into the fiber). The reason for the laser emission being self-terminating is that the lower laser level [$^3F_4$] has a longer lifetime (6.4 ms) than the upper level [$^3H_4$] (1.1 ms). However, if the fib[er] was pumped sufficiently hard, CW operation could be enforced. The threshold for CW operation was $\approx$480 mW incident pump power. As a result of the low value of output coupling, the efficiency of this device was rather low, with <1 mW of output power being measured.

Carter et al. establishes that the thulium doped fluorozirconate fiber laser is prone to self-termination limiting the slope efficiency of any CW laser output at 1.4–1.5 μm. In fact, only a negligible output at <1 mW is observed for the $^3H_4 \to {}^3F_4$ transition corresponding to the output at 1.47 μm. Id at 220.

SUMMARY OF THE INVENTION

It is therefore an object of the present invention to provide a laser system for emitting a continuous wave (CW) laser output at a wavelength corresponding to a self terminating laser transition.

It is another object of the present invention to provide a laser system for emitting a continuous wave (CW) laser output at a wavelength corresponding to a self terminating laser transition and at a slope efficiency of at least 3%.

It is another object of the present invention to provide a fiber laser system doped with a rare earth activator ion for emitting a continuous wave (CW) laser output at a wavelength corresponding to a self-terminating laser transition.

It is another object of the present invention to provide an activator ion doped fiber laser system in which the fiber is selected from the group consisting of fluorozirconate, fluorophosphate and silica for emitting a continuous wave (CW) laser output at a wavelength corresponding to a self terminating laser transition.

It is another object of the present invention to provide a laser system for emitting at least two laser outputs, one a continuous wave laser output at a wavelength corresponding to a self-terminating transition and at least one other laser emission at a wavelength corresponding to a transition originating out of the lower energy level of the self-terminating transition to, typically, an even lower energy level.

It is another object of the present invention to provide a fiber laser system having a fiber and two reflective means or two mirrors butt-coupled at opposite ends of the fiber, having respective reflectivities at least sufficient, for example, above 90%, for producing CW lasing at preselected wavelengths where at least one preselected wavelength corresponds to a transition originating out of the lower energy level of the self-terminating laser transition.

It is another object of the present invention to provide a method and a laser system for emitting a continuous wave (CW) laser output at a wavelength corresponding to a self-terminating laser transition.

It is another object of the present invention to provide a method and a laser system for emitting a continuous wave (CW) laser output at a wavelength corresponding to a self terminating laser transition and at a slope efficiency greater than that achieved by a self-terminating fiber laser alone.

It is another object of the present invention to provide a method and a fiber laser system doped with a rare earth activator ion for emitting a continuous wave (CW) laser output at a wavelength corresponding to a self terminating laser transition.

It is another object of the present invention to provide a method and an activator ion doped fiber laser system in which the fiber is selected from the group consisting of fluorozirconate, fluorophosphate and silica for emitting a continuous wave (CW) laser output at a wavelength corresponding to a self terminating laser transition.

It is another object of the present invention to provide a method and a laser system for emitting at least two laser outputs, one a continuous wave laser output at a wavelength corresponding to a self-terminating transition and at least one other laser emission at a wavelength corresponding to a transition originating out of the lower energy level of the self-terminating transition to, typically, an even lower energy level.

It is another object of the present invention to provide a method and a fiber laser system having a fiber and two mirrors having respective reflectivities of at least 90% at preselected wavelengths butt-coupled at opposite ends of the fiber, where at least one preselected wavelength corresponds to a transition originating out of the lower energy level of the self-terminating transition.

These and other objects of the invention are achieved by providing a fiber laser system comprising mirrors with preselected reflectivities of at least 90% at the laser emission output wavelengths butt-coupled to an end-pumped fiber laser doped with a preselected type of activator ions to produce simultaneous laser emission outputs of which one emission is a continuous wave (CW) laser emission at a wavelength corresponding to a self-terminating laser transition determined by the type of rare earth activator ions used.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

The following detailed description of the invention is provided to aid those skilled in the art in practicing the present invention. However, the following detailed description of the invention should not be construed to unduly limit the present invention. Variations and modifications in the embodiments discussed may be made by those of ordinary skill in the art without departing from the scope of the present inventive discovery.

Referring back to the condition for CW lasing in a self-terminating laser transition, namely, $\tau_{upper} > \beta_{upper \rightarrow lower} \tau_{lower}$, it can be shown that CW lasing can be achieved even if $\tau_{upper} < \tau_{lower}$. Given a self-terminating laser transition from an upper energy level to a lower energy level, the condition for CW lasing, $\tau_{upper} > \beta_{upper \rightarrow lower} \tau_{lower}$ can be rewritten as $\tau_{upper \rightarrow lower} > \tau_{lower}$ as follows:

$$\tau_{upper} > \beta_{upper \rightarrow lower} \tau_{lower}$$

$$\tau_{upper} > (W_{upper \rightarrow lower}/W_{upper}) \tau_{lower}$$

$$\tau_{upper} > (\tau_{upper}/\tau_{upper \rightarrow lower}) \tau_{lower}$$

$$\tau_{upper \rightarrow lower} > \tau_{lower} \text{ where}$$

$\tau_{upper}$ is the upper laser energy level electron lifetime, $\tau_{lower}$ is the lower laser energy level electron lifetime, $\beta_{upper \rightarrow lower}$ is the branching ratio from the upper laser energy level to the lower energy laser level, $W_{upper}$ is the total relaxation rate from the upper laser energy level and $W_{upper \rightarrow lower}$ is the relaxation rate from the upper laser energy level to the lower laser energy level. The present invention accomplishes CW lasing for a self-terminating laser transition where $\tau_{upper} < \tau_{lower}$ by satisfying the condition $\tau_{upper \rightarrow lower} > \tau_{lower}$ by reducing the value of $\tau_{lower}$. The value of $\tau_{lower}$ is reduced by stimulating electron transfer out of the lower laser energy level.

Figure 1:
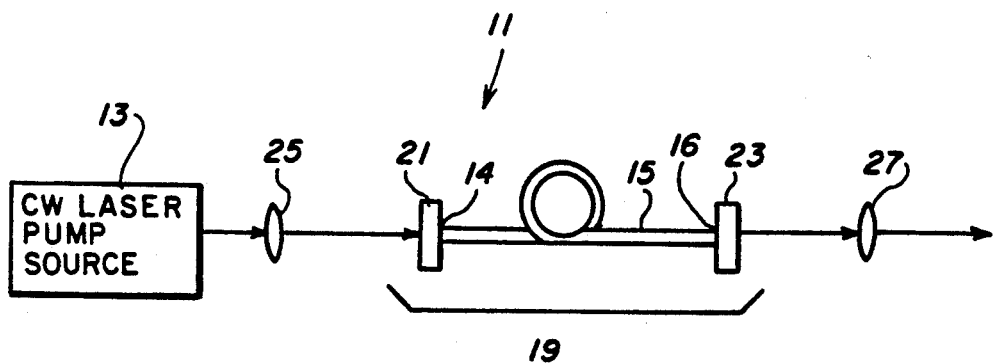
FIG. 1 illustrates a preferred embodiment of the invention.

Referring now to the drawings, FIG. 1 illustrates a preferred embodiment of an exemplary thulium doped, fiber laser 11 that is end-pumped by a continuous wave (CW) laser output from a laser pump source 13. The laser pump source 13 is preferably a laser diode source, but it can be a titanium laser or other pump source that can resonantly pump the $^3H_4$ level of the thulium. The fiber laser 11 is comprised of a host optical fiber that is doped with thulium activator ions or lasant ions (not shown) to form a gain medium fiber or laser fiber 15. Ends 14 and 16 of the laser fiber 15 are butt-coupled to the sides of an input mirror 21 and an output mirror or output coupler 23 within a cavity 19 formed or defined by the mirrors 21 and 23.

It should be noted at this time that a typical length of this laser fiber 15 would be between 20 cm and 120 cm. However, the transition of 1.46 μm is not strongly dependent on the length of the fiber 15. For example, for a length of 100 cm of laser fiber 15, the output wavelength would be about 1.47 μm. On the other hand, for a length of 32 cm of the laser fiber 15, the output wavelength would be about 1.46 μm. If scattering and other losses were decreased, the length of the fiber 15 could be increased to hundreds of centimeters with good laser performance.

The laser fiber 15 can be a fluoride fiber, such as a fluorozirconate fiber or a fluorophosphate fiber. For purposes of this description, the laser fiber 15 is preferably a single-mode fluorozirconate glass fiber. This fiber material is well-known in the art. A preferred fluorozirconate is referred to as ZBLAN, which is an acronym derived from the constituent parts of fluorozirconate, namely, $ZrF_4$, $BaF_2$, $LaF_3$, $AlF_3$ and $NaF$.

Fluoride glass materials are attractive hosts for obtaining CW lasing in singly doped $Tm^{3+}$ at 1.46 μm. An advantage of the fluoride glass is that it can be easily drawn into a fiber. The concentration of $Tm^{3+}$ in the laser fiber 15 can be kept small and the small mode volume attained by the fiber-wave guiding properties and small core cross-section result in high power densities allowing laser threshold to be reached with relatively low pump power.

It should be understood that other fluorozirconates can be used in the fabrication of the host optical fiber 15. For example, a fluorozirconate fiber can be fabricated by using constituents selected from the exemplary group consisting of $YF_3$, $LuF_3$, LiF, Naf, KF, $MgF_2$, $SrF_2$, $CaF_2$, $BaF_2$, and $PbF_2$. A fluorophosphate fiber can be fabricated from the following exemplary typical fluorophosphate compositions of:

| Compound | Mole Weight Percent |
| --- | --- |
| LiF + NaF + KF | 11–16 |
| CaF2 + MgF2 + BaF2 + SrF2 | 45–52 |
| AlF3 + LaF3 | 28–34 |
| P2O5 | 5–8 |

The laser fiber 15 is doped with trivalent thulium activator ions ($Tm^{3+}$) having a mole weight percentage in the broad range of 0.01% to 3.0%, a mole weight percentage in the preferred range of 0.1% to 1.0%, or a most preferred mole weight percentage of 0.5% in the laser fiber 15. For a most preferred mole weight percentage of 0.5% of thulium ions in the fiber 15, the constituent ZBLAN parts of $ZrF_4$, $BaF_2$, $LaF_3$, $AlF_3$ and NaF would have the respective exemplary mole weight percentages of 53.8%, 20.0%, 4.04%, 3.16% and 18.87%, and the thulium activator ions would be in the compound $TmF_3$ and would substantially have the mole weight percentage of 0.5% in the host ZBLAN fiber 15.

The laser diode source 13 supplies an exemplary 200 mW, continuous wave (CW), pump beam at an exemplary wavelength at 792 nm to cause the thulium doped fiber laser 11 to produce CW laser emissions at wavelengths substantially at 1.46 μm and 1.86 μm. The laser pump source 13 is preferably a GaAlAs laser diode array or a GaAlAs laser diode. Approximately 27 mW of the GaAlAs pump beam is collected and focused by conventional optics 25 onto a spot approximately 10 μm by 10 μm at the surface of the end of the laser fiber 15 in optical contact with the mirror 21.

The input mirror 21 is transparent to the 792 nm wavelength of this exemplary 27 Mw of pump power that is incident thereon, but is highly reflective at 1.46 μm and 1.86 μm. The reflectivities of mirror 21 at 1.46 μm and 1.86 μm are typically 96% and 90%, respectively. The reflectance of the output mirror 23 at 1.46 μm can be between 4% and 98%, but is preferably between 80% and 98%, and most preferably is about 96%. However, for purposes of this discussion, mirror 23 is approximately 90% reflective (10% transmissive) at the output wavelength of 1.46 μm.

For example, reflective mirrors butt-coupled to the thulium doped fluorozirconate laser fiber which mirrors have exemplary preselected reflectivities of at least 90% between 1.4–1.5 μm and 1.8–1.9 μm, respectively, are used. The laser output between 1.4–1.5 μm corresponds to the $^3H_4 \rightarrow ^3F_4$ transition and the laser output between 1.8–1.9 μm corresponds to the $^3F_4 \rightarrow ^3H_6$ transition. The latter transition depopulates the $^3F_4$ lower energy level which is otherwise self-terminating with respect to the $^3H_4$ upper energy level. The laser output between 1.4–1.5 μm is enhanced by the high reflectivity selected for wavelengths between 1.4–1.5 μm and 1.8–1.9 μm at the butt-coupled mirrors. Furthermore, the laser output between 1.8–1.9 μm is also enhanced by the high reflectivity selected for wavelengths between 1.8–1.9 μm at the butt-coupled mirrors.

As a result of the high transmissivity of the input mirror 21 to the 792 nm wavelength of the diode pump power incident thereon, approximately 85% of the exemplary 27 Mw of pump power passes through the mirror 21 and is launched into the input end of the laser fiber 15. Approximately 95% of this launched power is absorbed by the thulium dopant at this low pump power. Upon being longitudinally pumped by this pump power, the thulium doped, ZBLAN fiber laser 11 produces a CW laser emission at substantially 1.46 μm. Heretofore, CW lasing at 1.46 μm in a thulium-doped fluorozirconate fiber has been very poor, with such very poor performance attributed to the self-terminating nature of the transition.

Figure 2:
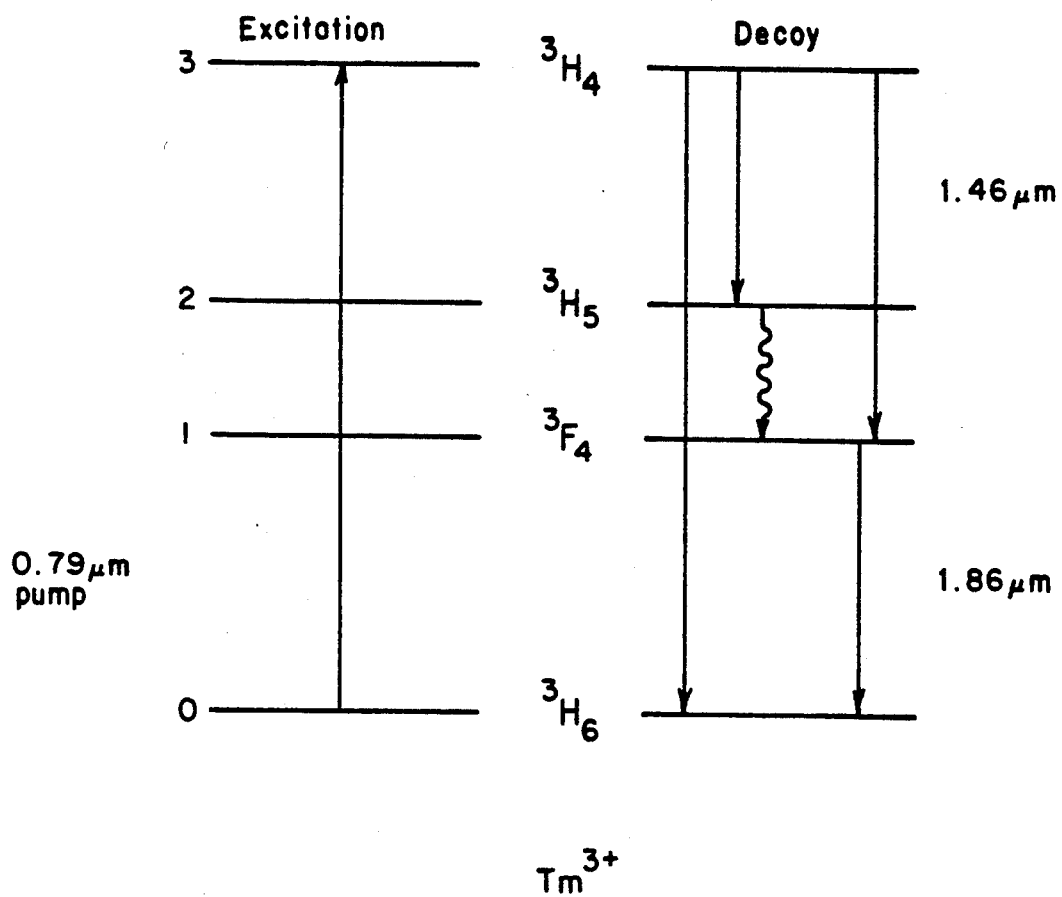
FIG. 2 illustrates an energy level diagram of trivalent thulium, indicating the 1.46 and the 1.86 μm transitions, respectively.

Referring to FIG. 2, the self-termination observed between 1.4–1.5 μm in a thulium doped fiber laser 11 is reduced by depopulating the $^3F_4$ energy level, thereby, allowing the $^3H_4 \rightarrow ^3F_4$ laser transition to occur near 20% slope efficiency. The present operation of depopulating the lower energy level, $^3F_4$, is accomplished generally by increasing stimulated emissions from the lower laser energy level population, thus, allowing the $^3H_4 \rightarrow ^3F_4$ transition to continue and resulting in significantly increased slope efficiency. Increasing stimulated emissions for a transition out of the lower energy level, $^3F_4$, is accomplished by using mirrors 21 and 23 butt-coupled to the thulium doped fiber 15 with preselected reflectivities in excess of 90% at 1.8–1.9 μm. The present method is applicable to other fiber laser systems where self-termination causes low slope efficiencies for outputs from activator ion doped fiber lasers. Slope efficiency in excess of 15% between 1.4–1.5 μm for a thulium doped fiber laser has previously not been observed due to self-termination resulting from the longer lifetime of electrons at the $^3F_4$ lower energy level than at the $^3H_4$ higher energy level of thulium.

Figure 3:
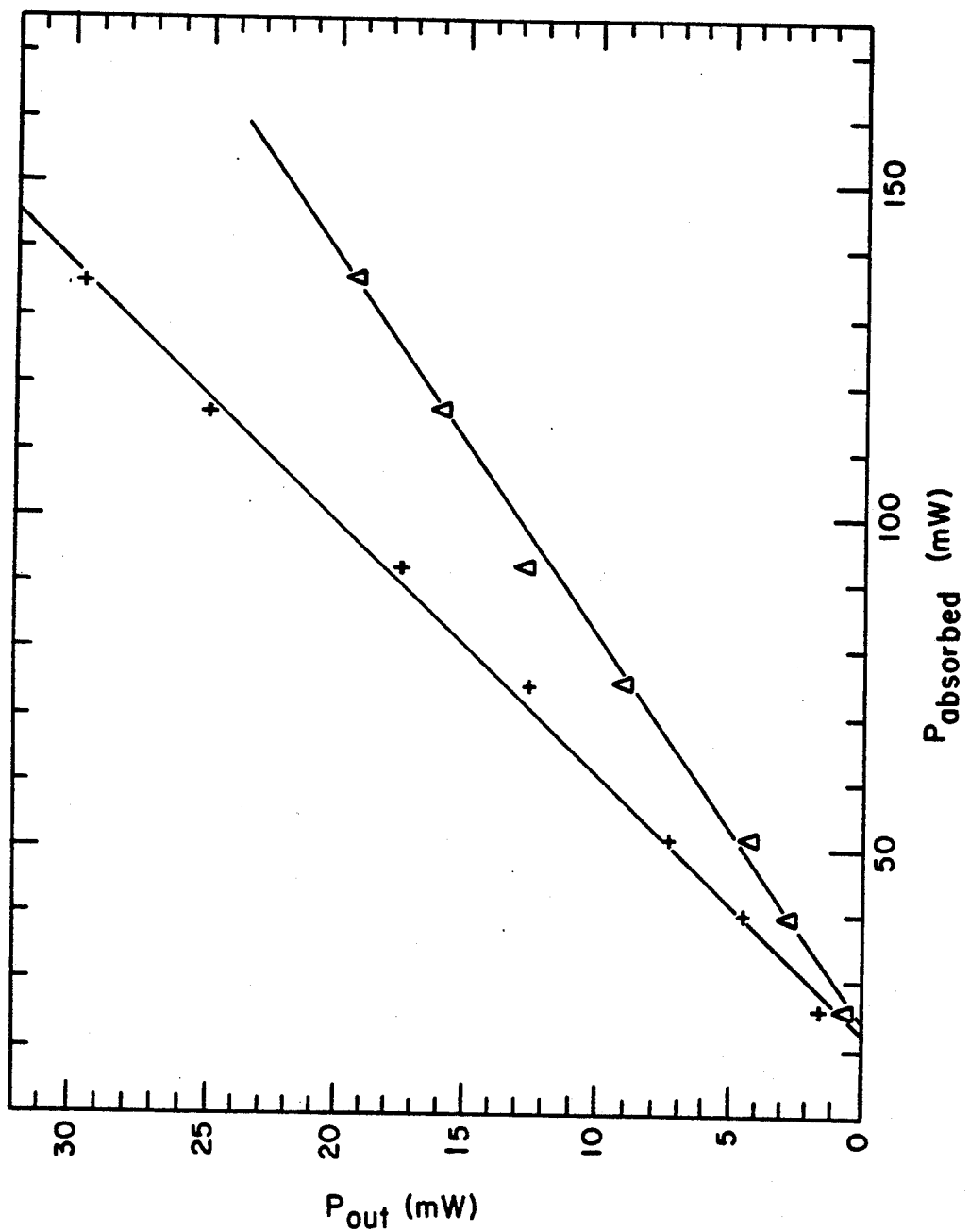
FIG. 3 illustrates laser efficiency data obtained from an exemplary thulium doped ZBLAN fiber laser system of FIG. 1 with resultant slope efficiencies of approximately 16% and 26% at 1.46 μm and at 1.86 μm, respectively.

Referring to FIG. 3, the power absorbed is plotted against the power output from the thulium-doped fiber laser system measured at 1.46 μm and 1.86 μm. The slope of each line depicted in FIG. 3 represents the slope efficiency of the transitions at 1.46 μm and 1.86 μm. The measured slope efficiencies are about 16% and 26% at 1.46 μm and at 1.86 μm, respectively. The higher slope efficiency is observed at 1.86 μm. The efficiency data as obtained is a function of pump power absorbed in a thulium doped ZBLAN fiber 15.

Having described the invention, the following example is given to illustrate specific applications of the invention, including the best mode now known to perform the invention. This specific example is not intended to limit the scope of the invention described in this application.

EXAMPLE

The experimental configuration is shown in FIG. 1. The pump source 13 used was an argon laser-pumped Ti:Sapphire laser capable of delivering approximately 200 mW CW power at 0.79 μm. However, a diode laser source is preferred to a Ti:Sapphire laser, as shown in FIG. 1. The laser fiber 15 is butt-coupled between plane mirrors 21 and 23 to form a laser cavity 19. Mirror 21 was coated for high reflectivity at 1.46 μm and 1.86 μm and high transmissivity at 0.79 μm. Mirror 23 was coated for 0.9 reflectance at 1.86 μm and 0.96 reflectance at 1.46 μm. The diameter of the fiber core (not shown) is 15 μm. The pump beam was focused to a spot size of approximately 10 μm by lens 25, with a numerical aperture of 0.12, matching the fiber numerical aperture. Lens 27 collimated the fiber laser beam.

The length of fiber 15 was chosen for efficient unsaturated absorption of the preselected pump beam, but short enough for low absorption loss at 1.86 μm. Emission spectra (not shown) was obtained while pumping a short section of 0.1% Tm:ZBLAN fiber at 0.79 μm. To date we have obtained a maximum output power of 49 mW for an absorbed pump power of 145 mW to give a slope efficiency of 16% for the 1.46 μm laser and 25% for the 1.86 μm laser.

It should be understood that many modifications and variations of the present invention are possible within the purview of the claimed invention. It is therefore to be understood that, within the scope of the appended claims, the invention may be practiced otherwise than as specifically described.

What is claimed is:

1. A fiber laser system for producing a continuous wave (CW) fiber laser output, said fiber laser system comprising:
    a fiber host medium doped with a preselected concentration of activator ions to form a fiber;
    first and second reflective means butt-coupled to first and second opposite ends of said fiber to cooperatively form a fiber laser, said reflective means having reflectivities sufficient for producing continuous wave (CW) lasing at first and second preselected wavelengths when pumped by a pump beam; and
    a laser pumping means directed at said fiber for providing a continuous wave (CW) pump beam operating at a preselected pump wavelength sufficient for promoting electrons of said activator ions to the upper energy level of a self-terminating laser transition;
    said second reflective means operating as a fiber laser output coupler through which passes said CW fiber laser output at said preselected first wavelength corresponding to said self-terminating laser transition of said activator ions from said fiber at a slope efficiency greater than that achieved by a self-terminating fiber laser.

2. The laser system of claim 1 wherein said first and second reflective means disposed at said first and second opposite ends of said fiber thereby form a resonant cavity therebetween; and
    said second reflective means operating as said fiber laser output coupler.

3. The laser system of claim 1 wherein said second preselected wavelength corresponds to a transition out of said lower energy level of said self terminating laser transition into an even lower energy level thereby increasing the slope efficiency of the fiber laser output corresponding to said self-terminating laser transition and eliminating the large power loss of said fiber laser output due to self-termination and producing the CW fiber laser output at said first preselected wavelength.

4. The laser system of claim 1 wherein said fiber host medium is selected from the group consisting of fluorozirconate fiber host medium, fluorophosphate fiber host medium, and low-loss, water-free, silica fiber host medium.

5. The laser system of claim 1 wherein, said preselected activator ions are selected from the group consisting of the rare earth ions.

6. The laser system of claim 5 wherein, said rare earth ions are selected from the group consisting of praseodymium (Pr), neodymium (Nd), promethium (Pm), samarium (Sm), europium (Eu), gadolinium (Gd), terbium (Tb), dysprosium (Dy), holmium (Ho), erbium (Er) and thulium (Tm).

7. The laser system of claim 1 wherein, said fiber is comprised of fluorophosphate fiber host medium doped with thulium activator ions.

8. The laser system of claim 1 wherein, said fiber is comprised of a fluorozirconate fiber host medium which is doped with thulium activator ions.

9. The laser system of claim 1 wherein, said fiber is comprised of a low-loss, water-free, silica fiber host medium doped with thulium activator ions.

10. The laser system of claim 1 wherein, said fiber is comprised of:
    fluorozirconate glass fiber host medium having the constituent parts of $ZrF_4$, $BaF_2$, $LaF_3$, $AlF_3$ and NaF; and
    said activator ions are thulium ions.

11. The laser system of claim 10 wherein, said fiber further comprises:
    said fluorozirconate glass fiber host medium having the constituent parts of $ZrF_4$, $BaF_2$, $LaF_3$, $AlF_3$ and NaF which substantially have the respective mole percentages of 53.8%, 20.0%, 4.04%, 3.16% and 18.87%; and
    said thulium activator ions are in the compound $TmF_3$ which substantially has a concentration of 0.1 mole % of total fiber content.

12. The laser system of claim 1 wherein, said pump means are selected from the group consisting of GaAlAs laser diode source, InGaAlP laser diode source, GaAlAs laser diode array, and InGaAlP laser diode array which lase at a wavelength in the range of 620–860 nm.

13. The laser system of claim 1 wherein, said pump means are selected from the group consisting of GaAlAs laser diode source and GaAlAs laser diode array which lase at a wavelength of substantially 786 nm.

14. The laser system of claim 1 wherein said activator ions comprise thulium activator ions and wherein said thulium activator ions have a concentration range of 0.01–0.5 mole % of total fiber content.

15. The laser system of claim 1 wherein said activator ions comprise thulium activator ions and wherein said thulium activator ions have a concentration range of 0.04–0.25 mole % of total fiber content.

16. The laser system of claim 1 wherein said activator ions comprise thulium activator ions and wherein said thulium activator ions have a concentration of substantially 0.1 mole % of total fiber content.

17. The laser system of claim 1 wherein said fiber comprises a thulium-doped fiber to cause said fiber laser to become a thulium doped fiber laser and wherein said thulium-doped fiber laser is responsive to said CW pump beam at a wavelength of substantially 786 nm for producing a laser emission corresponding to the $^3H_4$–$^3F_4$ laser transition having the wavelength substantially between 1.4–1.5 μm.

18. The laser system of claim 1 wherein:
said first reflective means is highly transmissive to said CW pump beam at said preselected pump wavelength and highly reflective to said wavelengths between 1.4–1.5 μm and 1.8–1.9 μm of said output CW laser emission;
said second reflective means is highly reflective to wavelengths between 1.4–1.5 μm and 1.8–1.9 μm of said output CW laser emission; and
said fiber comprises a thulium-doped fiber, said thulium-doped fiber butt-coupled between said first and second reflective means and being responsive to said CW pump beam for producing said CW fiber laser output between 1.4–1.5 μm.

19. The laser system of claim 18 further including:
said resonant cavity having losses of 10% or less.

20. The laser system of claim 18 further including:
optical means responsive to said CW fiber laser output between 1.4–1.5 and 1.8–1.9 μm for collimating said CW fiber laser output.

21. The laser system of claim 1 wherein said fiber comprises a thulium-doped fiber and said laser pump means comprises:
a laser diode array for emitting the CW pump beam at the preselected pump wavelength; and
optical means for directing the CW pump beam into said thulium-doped fiber.

22. The laser system of claim 1 wherein, said fiber laser system produces said CW fiber laser output substantially between 1.4–1.5 μm and 1.8–1.9 μm at a slope efficiency of substantially 16% and 25%, respectively.

23. A method for producing a continuous wave (CW) fiber laser output at a slope efficiency greater than that achieved by a self-terminating fiber laser, said method comprising the steps of:

continuously pumping an activator ion doped fiber host medium at a preselected pump wavelength sufficient to enable the activator ion doped fiber host medium to produce the continuous wave (CW) fiber laser output at a first preselected wavelength corresponding to the self-terminating laser transition; and producing the CW fiber laser output at the first preselected wavelength corresponding to the self-terminating laser transition wherein said producing step includes the steps of:
utilizing first and second reflective means, with preselected first, second and third reflectivities, the first and second reflective means butt-coupled to first and second opposite ends of the activator ion doped fiber host medium;
preselecting the first reflectivity of the first reflective means to allow, at least, 50–100% of incoming pump power at the preselected pump wavelength to be absorbed by the activator ion doped fiber host medium;
preselecting the second reflectivity of the first and second reflective means sufficient for the CW fiber laser output at the first wavelength corresponding to the self-terminating transition;
preselecting the third reflectivity of the first and second reflective means sufficient for a fiber laser output at a second wavelength, said second wavelength corresponding to a laser transition out of the lower energy level of the self-terminating laser transition of the activator ion, to an even lower energy level of the activator ion thereby increasing the slope efficiency of the fiber laser output at the first wavelength corresponding to the self-terminating laser transition and eliminating the large power loss of the fiber laser output due to self-termination and thus producing the CW fiber laser output at the first preselected wavelength; and
allowing the resultant CW fiber laser output at the first wavelength to be transmitted through the second reflective means also operating as an output coupler.

\* \* \* \* \*